May 5, 1925. 1,536,980
A. STOLTENBERG
TRACTOR ATTACHMENT
Filed Sept. 13, 1922  2 Sheets-Sheet 1
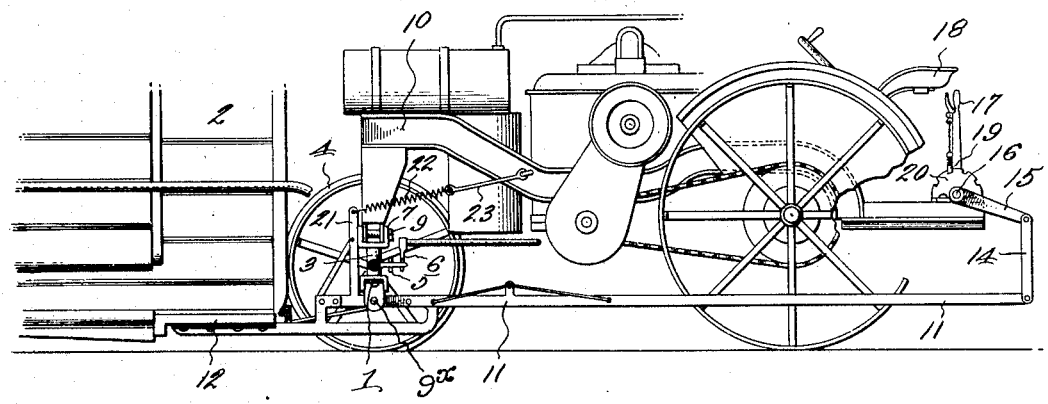
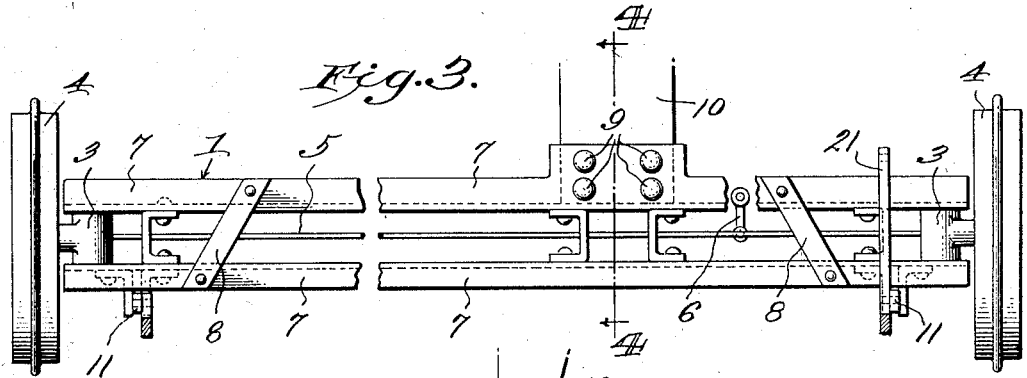
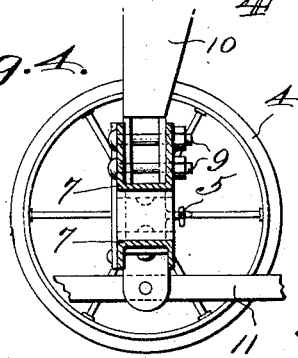
A. Stoltenberg, INVENTOR
BY Victor J. Evans ATTORNEY

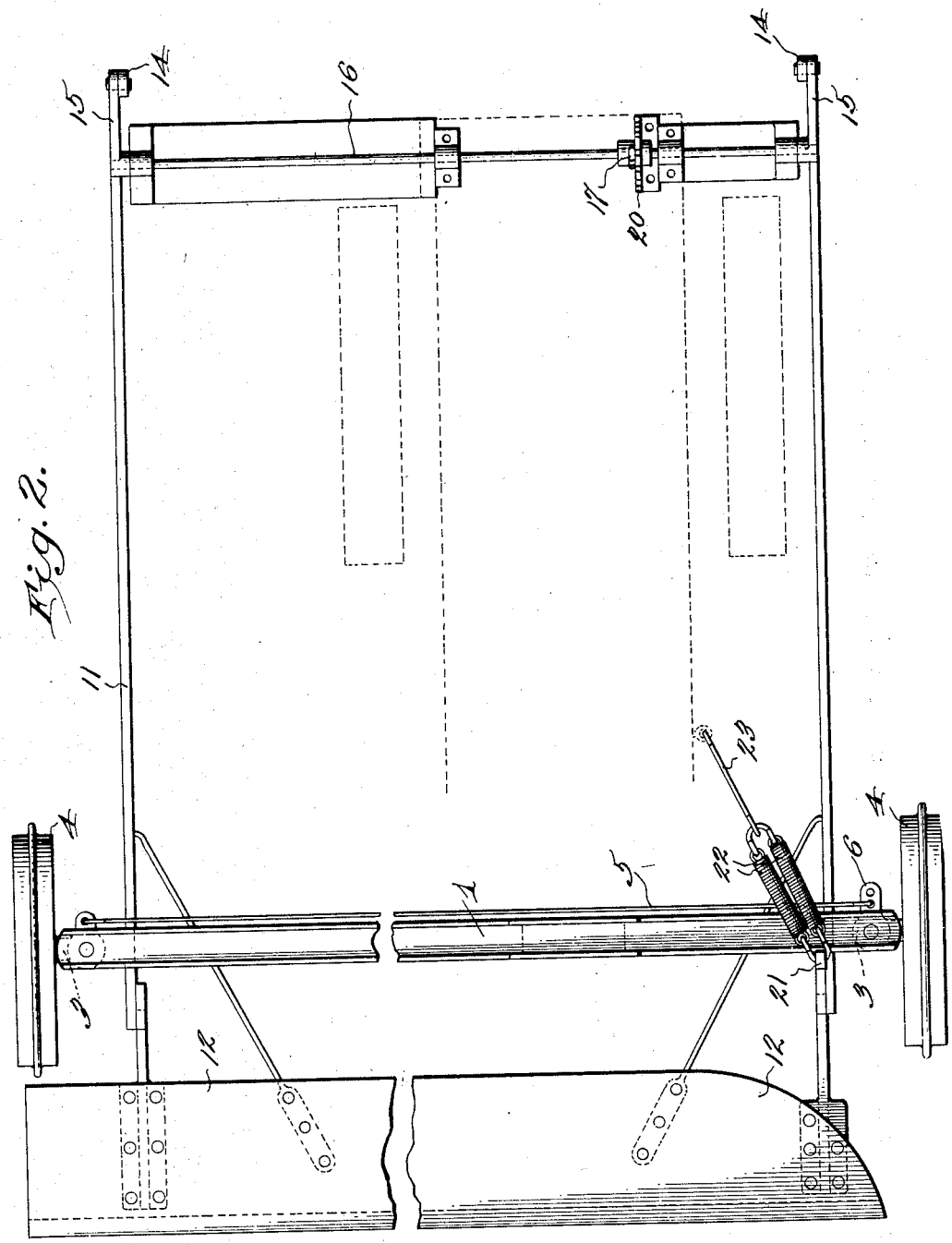

Patented May 5, 1925.

1,536,980

UNITED STATES PATENT OFFICE.

AUGUST STOLTENBERG, OF HOLYROOD, KANSAS.

TRACTOR ATTACHMENT.

Application filed September 13, 1922. Serial No. 588,013.

*To all whom it may concern:*

Be it known that I, AUGUST STOLTENBERG, a citizen of the United States, residing at Holyrood, in the county of Ellsworth and State of Kansas, have invented new and useful Improvements in Tractor Attachments, of which the following is a specification.

The object of my said invention is the provision of a tractor attachment in the form of a special front axle and appurtenances: the said front axle being adapted to be detached from the tractor to give place to an ordinary front axle when the tractor is to be used for general purposes and being equipped to carry a grain header or binder or combination binder and header in such manner that the platform of the header or other apparatus can be conveniently raised and lowered by the tractor driver, and the working parts of the header or other apparatus can be driven by the motor of the tractor incident to the propulsion of the header or other apparatus through the medium of the tractor.

To the attainment of the foregoing, the invention consists in the improvement as hereinafter described and definitely claimed.

In the accompanying drawings, forming part of this specification:—

Figure 1 is a side elevation showing a tractor equipped with my novel front axle and other appurtenances in association with so much of a header as is necessary to make clear the cooperation between the tractor and the header.

Figure 2 is a plan view illustrative of my improvement.

Figure 3 is a broken front elevation of the novel front axle.

Figure 4 is a vertical cross-section of the same, taken in the plane indicated by the line 4—4 of Fig. 1.

Similar numerals of reference designate corresponding parts in all of the views of the drawings.

Among other elements my improvement comprises a special front axle 1 which is used on the tractor in lieu of the ordinary front axle of the tractor when the tractor is to be employed for the operation of a header designated by 2.

The said special axle 1 is sufficiently long to carry the header in such manner as to assure proper balance of the header. Carried at the ends of the special axle 1 are pivoted knuckles 3, and mounted on the said knuckles 3 are steering wheels 4. It will also be noted that the arms of the knuckles 3 are connected by a cross rod 5, and that an axle arm 6 on one of the knuckles is adapted to be connected with the ordinary steering mechanism of the tractor. In the present and preferred embodiment of my invention the special axle 1 is made up of upper and lower channel irons 7, the said channel irons 7 being fixedly connected together at intermediate points in their length by ties 8 and being connected by bolts 9 to the tractor frame designated by 10.

Approximately fulcrumed at $9^x$ to the special axle 1 are longitudinal levers 11. These levers 11 are arranged at the sides of the tractor, and the forward arms of the levers are attached to the header 2, preferably to the platform 12 of the header—i. e., the platform that is arranged below the ordinary traveling conveyor. Manifestly when the levers 11 are rocked the platform 12 will be moved to raise or depress the forward portion of the header to adapt the same to the state of the grain to be harvested. The rear arms of the levers 11 are connected through the links or pitman 14 with cranks 15 at the ends of a rock shaft 16 on rear portion of the tractor frame; and it will also be noted that the rock shaft 16 is equipped with a hand lever 17 within convenient reach of the driver in the seat 18, and that the said hand lever 17 is equipped, in turn, with a detent 19 to cooperate with a fixed segmental rack 20 whereby at the will of the operator the levers 11 and the header 1 may be adjustably fixed in the positions desired. One of the levers 11 is provided on its forward arm with an upright 21, and to the said upright 21 is connected one or more retractile springs 22. The two springs 22 are connected in turn to a rod 23 that is appropriately connected at its rear end to an intermediate portion of the tractor frame. This provision serves to cushion the levers 11 and the header and to render steady and easy the manual adjustment thereof, the spring or springs 22 being tensioned when the forward arms of the levers 11 are depressed, and the springs therefor serving when the forward arms of the levers 11 and the header are raised, to assist in the said movement so as to lessen the labor imposed on the tractor driver. Manifestly it is within the purview of my invention to duplicate the spring equipment at the opposite side of the tractor frame.

It will be apparent from the foregoing that when my improvement is associated and combined with a header and a tractor in the manner illustrated and described, the header will be appropriately balanced and carried and the tractor driver will be enabled to steer the header to the best advantage.

I have entered into a detailed description of the construction and relative arrangement of the parts embraced in the present, and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. The combination in a tractor, of a frame, a front axle connected with the tractor frame and equipped with steering wheels, longitudinal levers carried by the said axle and extending in front and rear thereof, manually-controlled means mounted on the tractor frame and connected with the rear arms of the levers for the adjustment and adjustable fixing of the levers, means extending upwardly from and fixed to the forward arm of one lever, and cushioning means interposed between and connected to the said upwardly extending means and the tractor frame.

2. The combination in a tractor, of a frame, a front axle connected with the tractor frame and equipped with steering wheels, longitudinal levers carried by the said axle and extending in front and rear thereof, manually-controlled means mounted on the tractor frame and connected with the rear arms of the levers for the adjustment and adjustable fixing of the levers, means extending upwardly from and fixed to the forward arm of one lever, and cushioning means interposed between and connected to the said upwardly extending means and the rear portion of the tractor frame; the said cushioning means being in the form of a retractile longitudinal spring directly connected at its forward end to the said upwardly extending means, and a rod connected to the rear end of said spring and connected at its rear end to the tractor frame.

3. The combination in a tractor, of a frame, a front axle connected with the tractor frame and equipped with steering wheels, longitudinal levers carried by the said axle and extending in front and rear thereof, manually-controlled means mounted on the tractor frame and connected with the rear arms of the levers for the adjustment and adjustable fixing of the levers, means extending upwardly from and fixed to the forward arm of one lever, and cushioning means interposed between and connected to the said upwardly extending means and the rear portion of the tractor frame, the said front axle comprising upper and lower reversely arranged channel irons fixedly connected together and connected with the tractor frame, and the steering wheels being carried by swinging knuckles having body portions interposed between and pivotally connected to the end portions of the said channel irons.

In testimony whereof I affix my signature.

AUGUST STOLTENBERG.